(12) United States Patent
Dall'Abaco et al.

(10) Patent No.: US 11,518,192 B2
(45) Date of Patent: *Dec. 6, 2022

(54) TYRE FOR VEHICLE WHEELS

(71) Applicant: Pirelli Tyre S.p.A., Milan (IT)

(72) Inventors: Davide Dall'Abaco, Milan (IT); Virna Formaggio, Milan (IT); Luigia Rossiello, Milan (IT); Thomas Hanel, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 503 days.

This patent is subject to a terminal disclaimer.

(21) Appl. No.: 16/489,746

(22) PCT Filed: Mar. 5, 2018

(86) PCT No.: PCT/IB2018/051388
§ 371 (c)(1),
(2) Date: Aug. 29, 2019

(87) PCT Pub. No.: WO2018/163041
PCT Pub. Date: Sep. 13, 2018

(65) Prior Publication Data
US 2019/0381832 A1  Dec. 19, 2019

(30) Foreign Application Priority Data
Mar. 6, 2017 (EP) ..................... 17159432

(51) Int. Cl.
| *B60C 1/00* | (2006.01) |
| *B60C 13/00* | (2006.01) |
| *C08L 9/00* | (2006.01) |
| *C08K 5/06* | (2006.01) |
| *C08K 5/15* | (2006.01) |
| *C08K 5/13* | (2006.01) |

(52) U.S. Cl.
CPC .............. *B60C 1/0025* (2013.01); *B60C 1/00* (2013.01); *B60C 13/001* (2013.01); *C08K 5/06* (2013.01); *C08K 5/13* (2013.01); *C08K 5/15* (2013.01); *C08L 9/00* (2013.01); *C08L 2201/08* (2013.01); *C08L 2205/03* (2013.01)

(58) Field of Classification Search
CPC ... C08K 5/13; C08K 5/06; C08K 3/04; C08K 5/15; C08L 9/00; C08L 7/00; C08L 2205/03; C08L 2201/08; B60C 1/0025; B60C 13/001; B60C 1/00
See application file for complete search history.

(56) References Cited

U.S. PATENT DOCUMENTS

| 2,836,577 | A | 5/1958 | Kolka et al. | |
| 3,017,443 | A | 1/1962 | Chenicek et al. | |
| 4,550,412 | A | 10/1985 | Holcombe et al. | |
| 4,742,124 | A | 5/1988 | Tsutsumi et al. | |
| 6,201,049 | B1 | 3/2001 | Sakamoto et al. | |
| 6,598,632 | B1 | 7/2003 | Moreland et al. | |
| 7,365,112 | B2 | 4/2008 | Shiraishi et al. | |
| 2002/0174924 | A1 | 11/2002 | Zanzig et al. | |
| 2015/0266344 | A1* | 9/2015 | Giannini | B29B 7/90 152/451 |
| 2016/0108211 | A1 | 4/2016 | Busch et al. | |
| 2016/0177070 | A1* | 6/2016 | Galizio | C08L 9/00 524/21 |
| 2018/0030248 | A1* | 2/2018 | Hatano | C08L 9/00 |
| 2021/0324180 | A1* | 10/2021 | Dall'Abaco | C08L 15/02 |

FOREIGN PATENT DOCUMENTS

| EP | 0451604 A2 | 10/1991 | | |
| EP | 0636647 A1 | 2/1995 | | |
| EP | 1874860 | 1/2008 | | |
| EP | 1914245 A1 | 4/2008 | | |
| EP | 2424738 | 3/2012 | | |
| EP | 2749403 A1 | 7/2014 | | |
| EP | 2799454 A1 | 11/2014 | | |
| EP | 3081689 A1 | 10/2016 | | |
| JP | 2000-086824 | 3/2000 | | |
| JP | 2011-181150 | 9/2011 | | |
| JP | 5-179067 | 1/2013 | | |
| WO | WO 01/68761 A1 | 9/2001 | | |
| WO | WO-2016133030 A1 * | 8/2016 | | C08K 5/548 |

OTHER PUBLICATIONS

International Search Report form the European Patent Office in corresponding International Application No. PCT/IB2018/051388 dated Aug. 28, 2018.
Written Opinion of the International Searching Authority from the European Patent Office in corresponding International Application No. PCT/IB2018/051388 dated Aug. 28, 2018.

\* cited by examiner

*Primary Examiner* — Angela C Scott
(74) *Attorney, Agent, or Firm* — Finnegan, Henderson, Farabow, Garrett & Dunner, L.L.P.

(57) ABSTRACT

The present invention relates to a tyre for vehicle wheels comprising at least one external structural element comprising at least one external structural element comprising a crosslinked elastomeric material obtained by crosslinking a crosslinkable elastomeric composition comprising (i) at least one diene elastomeric polymer, and (ii) a system for protection against ozone substantially free of polymeric static protective agents which essentially consists of at least one phenolic antioxidant in an amount substantially equal to or higher than 3 phr.

10 Claims, 1 Drawing Sheet

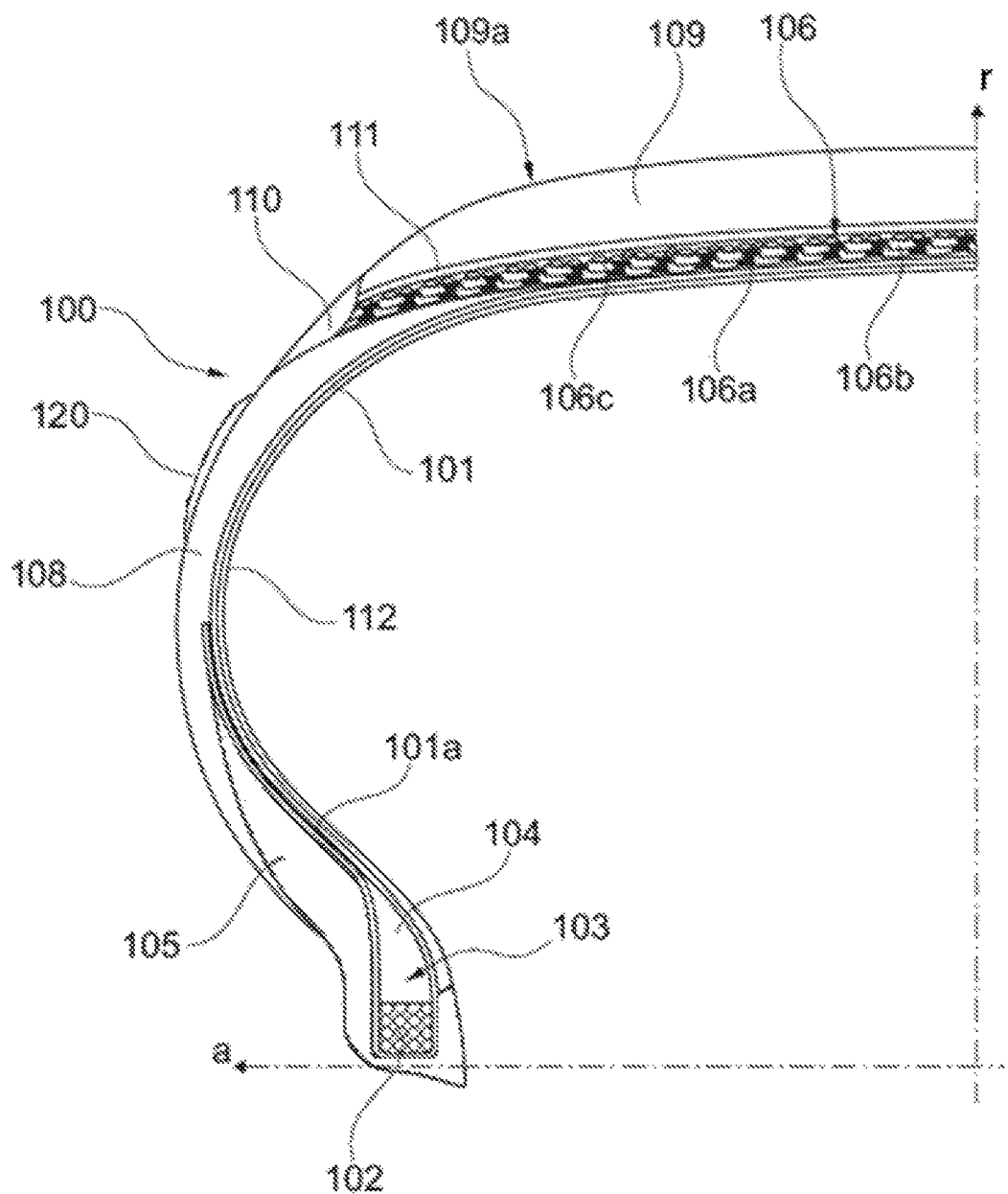

TYRE FOR VEHICLE WHEELS

This application is a national phase entry application under 35 U.S.C. § 371 based on International Application No. PCT/IB2018/051388, filed Mar. 5, 2018, and claims priority to European Patent Application No. 17159432.8, filed Mar. 6, 2017; the content of each application is incorporated herein by reference.

FIELD OF THE INVENTION

The present invention relates to a tyre for vehicle wheels comprising a pair of sidewalls with improved resistance to the formation of surface defects.

In particular, the present invention relates to a tyre comprising a pair of sidewalls which comprise an elastomeric composition containing a protective system capable of protecting said sidewalls from oxidation caused by atmospheric agents.

The tyre of the present invention is particularly suitable for displaying coloured sidewalls or sidewalls intended for the application of a coloured label, avoiding the appearance of stains on the sidewall itself and/or on said coloured label.

PRIOR ART

It is known that some rubber compositions are sensitive to the action of ozone. Compositions of vulcanized rubber based on diene elastomers are particularly sensitive.

When an article made of such a vulcanized elastomeric composition is subjected to the action of prolonged static and dynamic stresses in the presence of ozone, it is possible to see more or less pronounced cracks appearing on the surface of the article.

To minimize these effects of ozone, protective systems, which are designed to retard the formation and the propagation of the cracks under conditions of static and dynamic stress, are normally incorporated in these articles and, particularly in the sidewalls, depending on the elastomers which are comprised in the tyres. The protective systems known in the art include antiozonant materials which rise to the surface of the sidewall of the tyre preventing the reaction of atmospheric ozone with the elastomeric polymer. Waxes or other polymeric static protective agents are also commonly used to provide additional static protection forming a protective coating on the surface of the sidewalls.

The protective systems comprising the combination of antioxidants and static protective agents have proved effective for minimization of cracks in the surface of the sidewalls. In particular, waxes and the other polymeric static protective agents tend to migrate rapidly onto the surface of the sidewalls and form a protective film, while the antioxidants tend to migrate slowly so as to provide a long lasting protection.

As the antioxidant, in general an amine-based antioxidant is used, in particular N-(1,3-dimethylbutyl)-N'-phenyl-p-phenylenediamine (DMBPPD), N-phenyl-N'-isopropyl-p-phenylenediamine (IPPD), or N-(1,3-dimethylbutyl)-N'-phenyl-phenylenediamine (6PPD) and, as the wax, in general a petroleum wax which comprises a component having from 20 to 50 carbon atoms and which has an average number of carbon atoms from 30 to 35 is used.

Unfortunately, the migration of the antiozonant compounds causes the formation of stains and colouring alteration of the sidewalls surfaces.

More precisely, the antioxidants can cause a colouring alteration of the sidewall of the tyre, in that upon emerging on the sidewall surface they are exposed to light radiation, to contact with air and with any possible pollutants, and tend to form yellowish or brown stains on the sidewalls surface, while the polymeric static protective agents, blooming to form a film on the surface of the tyre sidewall, can cause an alteration in its colouration forming white stains when the bloom is excessive.

The colouring alteration caused by the use of waxes and antioxidants has been addressed in the art, for example in JP11-181150, JP2000/086824, JP05-179067, U.S. Pat. Nos. 6,201,049, 7,365,112 and 6,598,632.

The Applicant has already addressed the problem, for example in EP2424738 and in EP1874860, replacing the wax with other polymeric static protective agents, such as for example, polyethylene glycol and (meth)acrylate copolymers and reducing the quantity of antioxidants used.

Also known in the art are other antioxidants, such as for example phenolic compounds sold under the trade name Irganox™, cyclic-acetals and enol-ethers sold under the trade name Vulkazon™, triazines sold under the trade name Durazone™, and N-oxides sold under the trade name Genox™. The phenolic compounds sold under the trade name Irganox™ are used in much smaller quantities, during the production of elastomeric polymers useful for the preparation of tyre compounds, for their antioxidant properties. The recommended amounts are generally less than 1%, and typically between 0.05 and 0.3% by weight with respect to the total weight of the composition.

EP1914245 discloses the use of small quantities of Irganox 1520 during the preparation of styrene-butadiene elastomeric polymers (SBR) used for the preparation of tyre compounds via the addition of the conventional additives used in the manufacture of tyres, such as, for example, reinforcing agents, vulcanizers, accelerants, oils, antioxidants, plasticizers, and so on. The tyre compound exemplified contained Santoflex 14, the typical antioxidant N-(1,3-dimethylbutyl)-N'-phenyl-phenylenediamine (6PPD).

EP2749403 discloses the use of small quantities of Irganox 1520, about 0.15 phr, during the preparation of styrene-butadiene elastomeric polymers (SBR) modified by the introduction into the polymer chain of tris(trimethylsiloxy)silane groups used for the preparation of compounds via the addition of the conventional additives used in the manufacture of tyres, among which the product Noccelar 6C, the typical antioxidant N-(1,3-dimethylbutyl)-N'-phenyl-phenylenediamine (6PPD), is cited.

EP2799454 discloses the use of conventional antioxidants, among which the Irganox phenolic antioxidants in combination with ultraviolet filters during the preparation of formulations used for the internal airtight layer of the tyre (liner) comprising styrene-isoprene-styrene, styrene-isobutylene (SIB) and styrene-isobutylene-styrene (SIBS) block copolymers.

SUMMARY OF THE INVENTION

The colouring alteration and/or the formation of stains in the sidewall of the tyre is an important problem from the commercial point of view since the sidewalls appearance can be an important element in influencing the purchaser choice at the moment of purchase of new tyres.

This problem arises to a still greater extent when the sidewall itself displays decorative parts and/or when decorative elements such as for example coloured labels are applied to the tyres sidewall.

The Applicant has observed that the colouring alteration or the formation of stains in the sidewall also affects said parts or said decorative elements.

These being actual decorative parts and/or elements, the adverse effect can be still more evident than that occurring in the normal sidewalls, in spite of the presence of the protective systems known in the art.

The Applicant therefore addressed the problem of overcoming the aforementioned disadvantages caused by the protective systems known in the art comprising antioxidants and polymeric static protective agents.

On the basis of the Applicant's experience, waxes and/or other protective polymers have always been considered necessary to confer a static protection against ozone during the storage of the tyre before and during its use.

In view of this, the Applicant firstly attempted to replace the amine-based anti-ozonant compounds with other known antioxidants, but did not obtain appreciable results, even upon increasing the quantities of such antioxidants well beyond the quantity recommended by the manufacturers and used in the art.

After extensive studies, the Applicant has finally surprisingly found that by using large quantities of phenolic antioxidant in the absence of wax or other polymeric static protective agents (such as polyethylene glycol, methacrylate copolymers and EPDM) it was possible to reduce the formation of stains while maintaining good protection, both static and dynamic, against ozone, a result totally unexpected in view of the fact that the addition even of minimal quantities of wax or other polymeric static protective agents led to a complete reversal of the results, which became unsatisfactory.

The Applicant thus has finally found that it was possible to overcome the aesthetic disadvantages of the stains formation, at the same time maintaining good protection against ozone, introducing into the elastomeric composition for the tyre sidewalls a system for protection against ozone comprising a phenolic antioxidant in amounts equal to or greater than 3 phr and substantially free of static protective agents, and preferably substantially free of other antiozonants and/or antioxidants, such as for example paraphenylenediamine antiozonants and/or antioxidants.

Thus, the present invention relates to a tyre for vehicle wheels comprising at least one external structural element comprising a crosslinked elastomeric material obtained by crosslinking a crosslinkable elastomeric composition comprising (i) at least one diene elastomeric polymer, and (ii) a system for protection against ozone substantially free of polymeric static protective agents which essentially consists of at least one phenolic antioxidant in an amount equal to or greater than 3 phr, preferably equal to or greater than 4 phr.

Preferably, said system for protection against ozone comprises, in addition to said at least one phenolic antioxidant, at least one cyclic-acetal or enol-ether antioxidant, in an amount equal to or greater than 1 phr, preferably equal to or greater than 2 phr.

For the purposes of the present description and for the claims that follow appended thereto, the expression "essentially consists of" means that the system for protection against ozone of the present invention only consists of at least one phenolic antioxidant together with other components not affecting the essential characteristics of the composition, in particular at least one cyclic-acetal or enol-ether antioxidant.

Advantageously, said system for protection against ozone is also substantially free of antiozonants and/or antioxidants different from said phenolic, cyclic-acetal or enol-ether antioxidant. In particular, said system for protection against ozone is substantially free of paraphenylenediamine antiozonants and/or antioxidants.

For the purposes of the present description and for the claims that follow appended thereto, the expression "substantially free" indicates an amount of from 0 phr to 0.5 phr.

Advantageously, the system for protection against ozone useful in the present invention does not comprise said polymeric static protective agents, in other words comprises an amount equal to 0 phr.

Preferably, the system for protection against ozone useful in the present invention does not comprise antiozonants and/or antioxidants different from said phenolic, cyclic-acetal or enol-ether antioxidant, in other words comprises an amount equal to 0 phr.

The expression "polymeric static protective agents" represents the group of compounds which consists of wax, polyethylene glycols, (meth)acrylate copolymers and EPDM.

Preferably said phenolic antioxidant is present in the system for protection against ozone in an amount lower than 15 phr, preferably lower than 12 phr.

Advantageously, said phenolic antioxidant is present in the system for protection against ozone in an amount of from 4 phr to 10 phr.

Preferably, said cyclic-acetal or enol-ether antioxidant is present in the system for protection against ozone in an amount lower than 10 phr, preferably lower than 8 phr.

Advantageously, said cyclic-acetal or enol-ether antioxidant is present in the system for protection against ozone in amounts of from 2 phr to 5 phr.

In particular, the ratio by weight between said phenolic antioxidant and said-cyclic acetal or enol-ether antioxidant is of from 1:1 to 4:1, preferably of from 2:1 to 3:1.

Useful examples of phenolic antioxidants usable in the present invention are pentaerythrityl tetrakis[3-(3,5-di-t-butyl-4-hydroxyphenyl) propionate] distributed by BASF as IRGANOX 1010; 2,2-thio-diethylene bis-[(3-(3,5-di-t-butyl-4-hydroxyphenyl) propionate)] distributed by BASF as IRGANOX 1035; octadecyl-3-(3,5-di-t-butyl-4-hydroxyphenyl) propionate distributed by BASF as IRGANOX 1076; isooctyl-3-(3,5-di-t-butyl-4-hydroxyphenyl) propionate distributed by BASF as IRGANOX 1135; 1,3,5-trimethyl-2,4,6-tris(3,5-di-t-butyl-4-hydroxybenzyl) benzene distributed by BASF as IRGANOX 1330; 4,6-bis (dodecylthiomethyl)-o-cresol distributed by BASF as IRGANOX 1726; 4,6-bis(octylthiomethyl)-o-cresol distributed by BASF as IRGANOX 1520; triethyleneglycol-bis[(3-(3-t-butyl-5-methyl-4-hydroxyphenyl) propionate)] distributed by BASF as IRGANOX 245; 1,6-hexanediol-bis[(3-(3, 5-di-t-butyl-4-hydroxyphenyl) propionate] distributed by BASF as IRGANOX 259; 4-{[4,6-bis(octylsulphanyl)-1,3, 5-triazin-2-yl]amino}-2,6-di-t-butylphenol distributed by BASF as IRGANOX 565.

Preferably, said phenolic antioxidant is selected in the group consisting of 4,6-bis (octylthiomethyl)-o-cresol distributed by BASF as IRGANOX 1520 and 4-{[4,6-bis (octylsulphanyl)-1,3,5-triazin-2-yl]amino}-2,6-di-t-butylphenol distributed by BASF as IRGANOX 565.

Useful examples of cyclic-acetal or enol-ether antioxidants are 3,9-di-3-cyclohexen-1-yl-2,4,6,10-tetraoxaspiro [5.5]undecane distributed by Lanxess as Vulkazon AFS/LG, and cyclohexen-3-ylidenemethyl benzylether distributed by Lanxess as Vulkazon AFD.

In particular, the tyre according to the present invention comprises at least one carcass structure having opposite side edges associated with respective annular reinforcing structures, optionally a belt structure applied in a radially outer position with respect to said carcass structure, a tread band applied in a radially outer position to said carcass structure, and a pair of sidewalls applied laterally on the opposite sides with respect to said carcass structure.

Advantageously, the external structural element used in the tyre according to the present invention is represented by the sidewall and/or the pair of sidewalls exposed to the action of the atmospheric agents.

In particular, the tyre for vehicle wheels according to the present invention comprises one or more decorative elements applied onto the external surface of said sidewall and/or said pair of sidewalls According to a preferred embodiment, the elastomeric composition used in the present invention comprises per 100 phr of said elastomeric composition:

($a_1$) at least one polyisoprene rubber in an amount higher than or equal to 20 phr, preferably from 30 phr to 90 phr, and ($a_2$) at least one diene elastomeric polymer different from the polyisoprene rubber ($a_1$) in an amount lower than or equal to 80 phr, preferably from 10 phr to 70 phr.

According to a preferred embodiment, the polyisoprene rubber ($a_1$) can be selected from natural or synthetic polyisoprene rubber, preferably from natural or synthetic cis-1, 4-polyisoprene rubber, synthetic 3,4-polyisoprene rubber, more preferably from natural cis-1,4-polyisoprene rubber (natural rubber). Preferably, said natural rubber is present in the abovementioned crosslinkable elastomeric composition in an amount of from 30 phr to 60 phr, more preferably from 30 phr to 50 phr.

According to a preferred embodiment, the diene elastomeric polymer ($a_2$) different from the polyisoprene rubber ($a_1$) can be selected from those commonly used in crosslinkable elastomeric compositions with sulphur, which are particularly suitable for the production of tyres, that is from elastomeric polymers or copolymers with an unsaturated chain having a glass transition temperature ($T_g$) generally below 20° C., preferably in the range from 0° C. to −110° C. These polymers or copolymers can be of natural origin or can be obtained by solution polymerization, emulsion polymerization or gas-phase polymerization of one or more conjugated diolefins, optionally mixed with at least one comonomer selected from monovinyl arenes and/or polar comonomers in an amount not higher than 60% by weight.

The conjugated diolefins generally contain from 4 to 12, preferably from 4 to 8 carbon atoms, and can be selected, for example, in the group comprising: 1,3-butadiene, 2,3-dimethyl-1,3-butadiene, 1,3-pentadiene, 1,3-hexadiene, 3-butyl-1,3-octadiene, 2-phenyl-1,3-butadiene, or mixtures thereof. 1,3-butadiene is particularly preferred.

The monovinyl arenes which can optionally be used as comonomers generally contain from 8 to 20, preferably from 8 to 12 carbon atoms and can be selected, for example, from: styrene, 1-vinylnaphthalene, 2-vinylnaphthalene, various alkyl, cycloalkyl, aryl, alkylaryl or arylalkyl derivatives of styrene such as, for example, α-methylstyrene, 3-methylstyrene, 4-propylstyrene, 4-cyclohexylstyrene, 4-dodecylstyrene, 2-ethyl-4-benzylstyrene, 4-p-tolylstyrene, 4-(4-phenylbutyl)styrene or mixtures thereof. Styrene is particularly preferred.

Polar comonomers which can optionally be used can be selected, for example, from: vinylpyridine, vinylquinoline, esters of acrylic acid and alkyl acrylic acids, nitriles, or mixtures thereof, such as for example methyl acrylate, ethyl acrylate, methyl methacrylate, ethyl methacrylate, acrylonitrile, or mixtures thereof.

Preferably, the diene elastomeric polymer ($a_2$) can be selected, for example, from: polybutadiene (in particular polybutadiene with a high 1,4-cis content), optionally halogenated isoprene/isobutene copolymers, 1,3-butadiene/acrylonitrile copolymers, styrene/1,3-butadiene copolymers, styrene/isoprene/1,3-butadiene copolymers, styrene/1,3-butadiene/acrylonitrile copolymers, or mixtures thereof. Polybutadiene (in particular, polybutadiene with a high 1,4-cis content, usually higher than 90%, and a low vinylic content, usually lower than 5%) or mixtures thereof are particularly preferred. Preferably, said polybutadiene is present in the abovementioned crosslinkable elastomeric composition in an amount of from 40 phr to 70 phr, more preferably from 50 phr to 70 phr.

The abovementioned crosslinkable elastomeric composition can optionally comprise at least one elastomeric polymer of one or more monoolefins with an olefinic comonomer or derivatives thereof. The monoolefins can be selected from: ethylene and α-olefins generally containing from 3 to 12 carbon atoms, such as for example propylene, 1-butene, 1-pentene, 1-hexene, 1-octene, or mixtures thereof. The following are preferred: copolymers between ethylene and an α-olefin, optionally with a diene; homopolymers of isobutene or copolymers thereof with small quantities of a diene, which are optionally at least partially halogenated. The diene optionally present generally contains from 4 to 20 carbon atoms and is preferably selected from: 1,3-butadiene, isoprene, chloroprene, neoprene, 1,4-hexadiene, 1,4-cyclohexadiene, 5-ethylidene-2-norbornene, 5-methylene-2-norbornene, vinylnorbornene or mixtures thereof. Among these, the following are particularly preferred: ethylene/propylene (EPR) copolymers or ethylene/propylene/diene (EPDM) copolymers; polyisobutene; butyl rubbers; halobutyl rubbers, in particular chlorobutyl or bromobutyl rubbers; or mixtures thereof.

The abovementioned crosslinkable elastomeric composition can optionally comprise at least one polyisoprene rubber ($a_1$) and/or at least one diene elastomeric polymer ($a_2$) which are functionalized by reaction with suitable terminating agents or coupling agents. In particular, the diene elastomeric polymers obtained by anionic polymerization in the presence of an organometallic initiator (in particular an organolithium initiator) can be functionalized by reaction of the residual organometallic groups deriving from the initiator with suitable terminating agents or coupling agents, such as for example imines, carbodiimides, alkyltin halides, substituted benzophenones, alkoxysilanes or aryloxysilanes (see for example the European patent EP 451 604 or the U.S. Pat. Nos. 4,742,124 and 4,550,142).

At least one reinforcing filler can be advantageously added to the aforesaid crosslinkable elastomeric composition, in an amount generally of from 0 phr to 120 phr, preferably from 20 phr to 90 phr. The reinforcing filler can be selected from those commonly used for crosslinked manufactured articles, in particular for tyres, such as for example carbon black, silica, alumina, aluminosilicates, calcium carbonate, kaolin or mixtures thereof. Carbon black, silica and mixtures thereof are particularly preferred.

According to a preferred embodiment, said carbon black reinforcing filler can be selected from those which have a surface area not lower than 20 $m^2$/g (determined from the STSA—statistical thickness surface area—according to ISO 18852:2005).

The silica which can be used in the present invention can generally be a pyrogenic silica or, preferably, a precipitated silica, with a BET surface area (measured according to the standard ISO 5794/1) from 50 m²/g to 500 m²/g, preferably from 70 m²/g to 200 m²/g.

When a reinforcing filler comprising silica is present, the crosslinkable elastomeric composition can advantageously incorporate a silane coupling agent capable of interacting with the silica and binding it to the elastomeric polymer during the vulcanization.

The coupling agents which are preferably used are those based on silane which can be identified, for example, by the following structural formula (I):

$(R_2)_3Si—C_tH_{2t}—X$ (I)

in which the $R_2$ groups, which can be the same or different from one another, are selected from: alkyl, alkoxy or aryloxy groups or from halogen atoms, provided that at least one of the $R_2$ groups is an alkoxy or aryloxy group; t is a whole number between 1 and 6 inclusive; X is a group selected from: nitroso, mercapto, amino, epoxide, vinyl, imide, chloro, $—(S)_uC_tH_{2t}—Si—(R_2)_3$ or $—S—COR_2$, in which u and t are whole numbers from 1 to 6, extremes included, and the $R_2$ groups are defined as stated above.

Among the coupling agents which are particularly preferred there are bis(3-triethoxysilylpropyl) tetrasulphide and bis(3-triethoxysilylpropyl) disulphide. Said coupling agents can be used as such or as suitable mixtures with an inert filler (for example carbon black) so as to facilitate their incorporation into the crosslinkable elastomeric composition.

According to a preferred embodiment, said silane coupling agent is present in the elastomeric composition in an amount of from 0.01 phr to about 10 phr, preferably of from about 0.5 phr to about 5 phr.

The crosslinkable elastomeric composition can be vulcanized according to the known techniques, in particular with sulphur-based vulcanization systems commonly used for diene elastomeric polymers. For this purpose, after one or more stages of thermomechanical treatment, a sulphur-based vulcanizing agent is incorporated into the materials together with vulcanization accelerators. In the final treatment phase, the temperature is generally maintained below 120° C. and preferably below 100° C., so as to avoid any undesired pre-crosslinking phenomena.

Preferably, said vulcanizing agent comprises sulphur-based vulcanization systems comprising sulphur or molecules containing sulphur (sulphur donors) together with vulcanization accelerators and/or activators known in the art.

The activators which are particularly effective are zinc compounds and in particular ZnO, ZnCO₃, zinc salts of saturated or unsaturated fatty acids containing from 8 to 18 carbon atoms, such as, for example, zinc stearate, which are preferably formed in situ in the elastomeric composition from ZnO and fatty acid, or mixtures thereof.

The accelerants which are commonly used can be selected from: dithiocarbamates, guanidine, thiourea, thiazoles, sulphenamides, thiurams, amines, xanthates or mixtures thereof.

According to a preferred embodiment, said crosslinkable elastomeric composition comprises an amount of vulcanizing agent equal to or higher than about 1 phr, preferably equal to or higher than about 2 phr.

Preferably, the amount of vulcanizing agent is lower than or equal to about 7.5 phr, preferably lower than or equal to about 7.

Advantageously, the amount of sulphur is of from about 2 phr to about 6.5 phr.

Said elastomer composition can comprise other commonly used additives, selected according to the specific application for which the composition is intended.

In particular, for the purpose of improving the processability, a plasticizer generally selected from mineral oils, vegetable oils, synthetic oils or mixtures thereof, such as, for example, aromatic oil, naphthenic oil, phthalates, soya oil or mixtures thereof can be added to said elastomeric composition. The amount of plasticizer is generally of from 0 phr to about 70 phr, preferably of from about 5 phr to about 30 phr.

The aforesaid crosslinkable elastomeric composition can be prepared by mixing together the elastomeric base components (a) together with the aforesaid system for protection against ozone (b) and with the other additives optionally present, according to the techniques known in the art. The mixing phases can be performed, for example, using an open mixer of the open mill type, or an internal mixer of the type with tangential rotors (Banbury) or with copenetrating rotors (Intermix), or in continuous mixers of the Ko-Kneader type (Buss), or of the double helix co-rotating or counter-rotating type.

DRAWINGS

The description will be presented herein below with reference to the attached drawings, provided solely for illustration purposes and thus non-limiting, in which:

FIG. 1 depicts in cross half-section a tyre for motor vehicle wheels according to a first embodiment of the present invention.

DETAILED DESCRIPTION OF THE INVENTION

In FIG. 1, "a" indicates an axial direction and "r" indicates a radial direction. For simplicity, FIG. 1 shows only a portion of the tyre, the remaining portion not shown being identical and arranged symmetrically with respect to the radial direction "r".

With reference to FIG. 1, the tyre 100 for motor vehicle tyres comprises at least one carcass structure, comprising at least one carcass layer 101 having respectively opposite ends fastened to respective annular anchoring structures 102, called bead wires, optionally combined with a bead filling 104. The region of the tyre comprising the bead wire 102 and the filling 104 forms an annular reinforcing structure 103, the so-called bead, intended for anchoring the tyre onto a corresponding mounting rim, not depicted.

The carcass structure is usually of the radial type, that is the reinforcing elements, parallel to one another, of the at least one carcass layer 101 are located on planes comprising the axis of rotation of the tyre and substantially perpendicular to the equatorial plane of the tyre.

Alternatively, tyres (not depicted) equipped with cross ply carcass structures are made.

In such tyres the carcass structure can comprise at least a first and a second carcass ply, radially superimposed, each made of elastomeric material and comprises a plurality of reinforcing elements arranged parallel to one another.

The carcass plies are radially superimposed in a manner such that the reinforcing elements of one ply are tilted with respect to the reinforcing elements of the radially superimposed carcass ply and to the equatorial plane.

Said reinforcing elements can be composed of metallic and/or textile cords, such as for example steel in the case of metallic cords or rayon, nylon or polyester (for example polyethylene naphthalate (PEN)) in the case of textile cords. Each annular reinforcing structure is associated with the carcass structure by back-folding of the opposite lateral edges of the at least one carcass layer 101 around the annular anchoring structure 102 so as to form the so-called carcass backfolds 101a as depicted in FIG. 1.

In one embodiment, the coupling between carcass structure and annular reinforcing structure can be provided by a second carcass layer (not shown in FIG. 1) applied in an axially outer position relative to the first carcass layer.

An anti-abrasive strip 105 is positioned in an outer position to each annular reinforcing structure 103. Preferably, each anti-abrasive strip 105 is positioned at least in an axially outer position to the annular reinforcing structure 103 extending at least between the sidewall 108 and the radially lower portion to the annular reinforcing structure 103.

Preferably, the anti-abrasive strip 105 is positioned so as to wrap the annular reinforcing structure 103 along the axially inner and outer and radially lower portion of the annular reinforcing structure 103 in such a manner as to interpose itself between the latter and the rim of the wheel when the tyre 100 is mounted on the rim.

Attached to the carcass structure is a belt structure 106 comprising one or more belt layers 106a, 106b arranged in radial superposition one relative to the other and relative to the carcass layer, having typically metallic reinforcing cords. Such reinforcing cords can have a crossed orientation with respect to a circumferential development direction of the tyre 100. "Circumferential" direction is understood to mean a direction generally turning in accordance with the direction of rotation of the tyre.

In the radially outermost position to the belt layers 106a, 106b there can be applied at least one zero degrees reinforcing layer 106c, commonly known as "0° belt", which generally incorporates a plurality of reinforcing cords, typically textile cords, oriented in a substantially circumferential direction, thus forming an angle of a few degrees (for example, an angle between about 0° and 6°) relative to the equatorial plane of the tyre, and coated with an elastomer material.

A tread band 109 in elastomeric compound is applied in a position radially external to the belt structure 106.

In some embodiments (for example tyres for motorcycle or scooter wheels) the belt structure can be absent.

Furthermore, on the lateral surfaces of the carcass structure, each extending from one of the lateral edges of the tread band 109 up to the respective annular reinforcing structure 103, respective sidewalls 108 of elastomeric compound made according to the present invention are applied in an axially outer position.

In a radially outer position, the tread band 109 has a rolling surface 109a intended to come into contact with the ground. Circumferential grooves, which are linked by transverse incisions (not shown in FIG. 1) in such a manner as to define a plurality of wedges of various shapes and dimensions distributed on the rolling surface 109a, are generally made in this surface 109a, which for simplicity in FIG. 1 is shown as smooth.

A sublayer 111 is positioned between the belt structure 106 and the tread band 109.

A strip constituted of elastomeric material 110, commonly known as "mini-sidewall", can possibly be present in the connecting region between the sidewalls 108 and the tread band 109, this mini-sidewall generally being obtained by co-extrusion with the tread band 109 and allowing an improvement in the mechanical interaction between the tread band 109 and the sidewalls 108. Preferably, the end portion of the sidewall 108 directly covers the lateral edge of the tread band 109.

In the case of tyres with no inner tube, a layer of rubber 112, generally known as "liner", which provides the necessary impermeability to the inflating air of the tyre, can also be provided in a radially inner position with respect to the carcass layer 101.

On the external surface of the sidewalls 108, decorative elements 120 such as coloured strips or writings, preferably in bright colours, can be applied for example by gluing or co-vulcanization.

The decorative elements 120 can be made of polymeric material of the elastomeric, plastic or elasto-plastic type filled with colourant metal oxides or with organic dyes.

Preferably, the decorative elements 120 are made with a composition comprising EPDM rubber, halobutyl, preferably chlorobutyl, rubber and natural rubber. Particularly preferred is a composition comprising 1-10% by weight of EPDM rubber, 10-30% by weight of halobutyl, preferably chlorobutyl, rubber and 15-35% by weight of natural rubber with respect to the total weight of the composition, the remaining percentage comprising pigments and other additives, and vulcanizing and coadjuvant chemical products.

The side of the decorative elements 120 intended for cohesion on the sidewall of the tyre can be coated with a heat-sensitive adhesive which can co-crosslink or can physically interact with the sidewall compound fixing the decorative element to the sidewall itself.

The surface of the decorative element exposed to atmospheric agents can advantageously be coated with a clear resin protective film in order to maintain for a longer time the aesthetic qualities of the decorative element during the use of the tyre.

The manufacture of the tyres 100 as described above, can be performed by assembly of respective semi-finished products on a moulding drum, not depicted, by means of at least one assembly device.

At least a part of the components intended to form the carcass structure of the tyre can be constructed and/or assembled on the moulding drum. More particularly, the moulding drum is suitable for receiving firstly the possible liner, then the carcass structure and the anti-abrasive strip. Next, devices not shown engage coaxially around each of the terminal rims one of the annular anchoring structures, position an external sleeve comprising the belt structure and the tread band in a position coaxially centred around the cylindrical carcass sleeve and adapt the carcass sleeve according to a toroidal configuration by means of radial expansion of the carcass structure, so as to bring about its application against a radially internal surface of the external sleeve.

Following the manufacture of the raw tyre, a moulding and vulcanization treatment is performed for the purpose of effecting the structural stabilization of the tyre by crosslinking the elastomeric compounds and of printing on the tread band a desired tread pattern and printing onto the sidewalls optional distinctive graphic symbols.

The decorative elements 120 can be affixed directly on the moulding drum before assembling the sidewalls, or can be positioned on the raw tyre before moulding and vulcanization, or can be applied to the sidewalls of the finished tyre downstream of the moulding and vulcanization treatment.

The present invention will be further illustrated hereinafter by means of a number of preparative examples, which are provided purely for illustrative purposes and without any limitation of this invention.

Example 1

The elastomeric compositions R (reference) and from 1 to 11 which comprise various quantities of 6PPD or of other antioxidants, in presence or absence of static protective agents (wax, PEG1500 or Melflux™ PP100) as shown in Table 1, were prepared as follows (the quantities of the various components are given in phr).

All the components, except for sulphur, retardant and accelerant (CBS), were mixed together in an internal mixer (model Pomini PL 1.6) for about 5 minutes (first phase). As soon as the temperature reached 145±5° C., the elastomer composition was discharged. The sulphur, the retardant and the accelerant (CBS) were then added and the mixing was performed in an open roll mixer (second phase).

TABLE 1

| Sample | R | 1 (c) | 2 (c) | 3 (c) | 4 (c) | 5 (c) | 6 (c) | 7 (c) | 8 (c) | 9 (i) | 10 (i) | 11 (i) |
|---|---|---|---|---|---|---|---|---|---|---|---|---|
| | | | | | First phase | | | | | | | |
| Natural rubber | 40 | 40 | 40 | 40 | 40 | 40 | 40 | 40 | 40 | 40 | 40 | 40 |
| Butadiene rubber | 60 | 60 | 60 | 60 | 60 | 60 | 60 | 60 | 60 | 60 | 60 | 60 |
| Carbon black 660 | 50 | 50 | 50 | 50 | 50 | 50 | 50 | 50 | 50 | 50 | 50 | 50 |
| Adhesive resin | 2 | 2 | 2 | 2 | 2 | 2 | 2 | 2 | 2 | 2 | 2 | 2 |
| Stearic acid | 2 | 2 | 2 | 2 | 2 | 2 | 2 | 2 | 2 | 2 | 2 | 2 |
| Zinc oxide | 2.85 | 2.85 | 2.85 | 2.85 | 2.85 | 2.85 | 2.85 | 2.85 | 2.85 | 2.85 | 2.85 | 2.85 |
| Wax | 2 | 2 | 2 | 2 | 2 | 2 | 2 | / | / | / | / | / |
| PEG 1500 | / | / | / | / | / | / | / | 2 | / | / | / | / |
| Melflux ™PP100 | / | / | / | / | / | / | / | / | 2 | / | / | / |
| 6PPD | 3 | / | / | / | / | / | / | / | / | / | / | / |
| Vulkazon AFS | / | 4 | 2 | 2 | 2 | 2 | / | / | / | 2 | 2 | / |
| Durazone 37 | / | / | 2 | / | / | / | / | / | / | / | / | / |
| Genox EP | / | / | / | 2 | / | / | / | / | / | / | / | / |
| Irganox 1520 | / | / | / | / | 2 | 4 | 8 | 8 | 8 | 4 | 6 | 8 |
| | | | | | Second phase | | | | | | | |
| Retardant | 0.1 | 0.1 | 0.1 | 0.1 | 0.1 | 0.1 | 0.1 | 0.1 | 0.1 | 0.1 | 0.1 | 0.1 |
| CBS | 0.8 | 0.8 | 0.8 | 0.8 | 0.8 | 0.8 | 0.8 | 0.8 | 0.8 | 0.8 | 0.8 | 0.8 |
| Sulphur | 2 | 2 | 2 | 2 | 2 | 2 | 2 | 2 | 2 | 2 | 2 | 2 |

Adhesive resin: Quintone A100, Zeon Corporation
6PPD: N-(1,3-dimethylbutyl)-N'-phenyl-phenylenediamine
Vulkazon AFS: 3,9-di-3-cyclohexen-1-yl-2,4,6,10-tetraoxaspiro[5.5]undecane
Durazone 37: 2,4,6-tris-(N-1,4-dimethylpentyl-p-phenylenediamino)-1,3,5- triazine
Genox EP: amines, bis(hydrogenated rape-oil alkyl)methyl, N-oxides
Irganox 1520: 4,6-bis [(octylthio)methyl]-o-cresol
Retardant: N-cyclohexylthiophthalimide
CBS: N-cyclohexyl-2-benzothiazyl sulphonamide
Melflux ™PP100: Copolymer of (meth)acrylic acid with ethylenically unsaturated monomers containing polyoxyethylene side chains (Degussa)

Example 2

Using the compounds of Table 1, rubber samples of dimensions 15×5×0.5 cm, vulcanized at 170° C. for 10 minutes, were made. Decorative labels of yellow colour (supplier Transfergomma) were applied onto the resulting samples by hot-transfer method in a manual press by applying a pressure of 10 kg/cm$^2$ for 10 seconds at 120° C.

The test samples thus obtained were exposed to a UV irradiation cycle (48 hours at 50° C.) using a Xenon chamber (supplier Q-Sun) according to the ASTM D1148 methodology, modified for use of the UV exposure only, with no washing cycles.

At the end of the test the test samples were visually inspected to assess their colouring alteration (browning) with respect to a reference sample not subjected to the treatment. A subjective mean qualitative score was given to the appearance of the surface of each test sample, as summarized below.

| Score | Appearance |
|---|---|
| A | no stains |
| B | slightly stained |
| C | stained |

The results of the subjective assessment are shown in the following Table 2.

The results obtained demonstrated that the replacement of the conventional paraphenylenediamine antiozonant (6PPD) with various types of antioxidants allowed a certain, but not entirely satisfactory, improvement even with large quantities.

The complete absence of stains was surprisingly observed in the samples containing the system for protection against ozone of the present invention, samples 9(i), 10(i) and 11(i), containing variable amounts of Irganox, alone or in combination with Vulcazon AFS, and free of polymeric static protective agents.

Example 3

The samples were then subjected to the dynamic ozone test, performed as follows, in accordance with the standard ISO 1431-1, to verify the compliance with the necessary requirements in spite of the elimination of the wax or other polymeric static protective agents.

The samples of the crosslinked elastomeric compositions described above (vulcanized at 170° C. for 10 minutes) having dimensions 50 mm×10 mm×2 mm were positioned inside a glass bell into which ozonized air was channelled [ozone concentration equal to 50+/−5 pphm (parts per hundred million)] and were subjected dynamically and continuously to traction from 0% to 20% deformation. The test was performed at 50+/−2° C.

Starting from the first hour, and then after every 2 hours (for a total time of 17 hours) under the aforesaid conditions,

TABLE 2

| Sample | R | 1 (c) | 2 (c) | 3 (c) | 4 (c) | 5 (c) | 6 (c) | 7 (c) | 8 (c) | 9 (i) | 10 (i) | 11 (i) |
|---|---|---|---|---|---|---|---|---|---|---|---|---|
| Visual test results | C | B | B | B | B | B | B | B | B | A | A | A | the samples were examined under the optical microscope (40×) to determine the presence of cracks.

The results of this test, summarized in the following Table 3, were expressed by means of an assessment scale which goes from 1 to 5, in which 1 indicates no cracks visible with the optical microscope (40×) and 5 indicates cracks visible with the optical microscope (40×) and to the naked eye.

TABLE 3

| Sample | 1 (c) | 2 (c) | 3 (c) | 4 (c) | 5 (c) | 6 (c) | 7 (c) | 8 (c) | 9 (i) | 10 (i) | 11 (i) |
|---|---|---|---|---|---|---|---|---|---|---|---|
| Dynamic ozone test results | 4 | 4 | 4 | 4 | 3 | 5 | 5 | 5 | 2 | 2 | 1 |

The results obtained showed that antiozonant systems containing 2 phr of wax and 4 phr of an antioxidant compound selected from Vulkazon AFS, Durazone, Genox EP, Irganox 1520, or 1:1 mixtures thereof, did not offer sufficient protection against the damaging action of ozone (samples 1-4 (c)).

The use of wax and of 6 phr of a 1:2 mixture of Vulkazon AFS and Irganox 1520 (sample 5(c)) provided a protection greater than that obtainable using the other antioxidants tested, but nonetheless not acceptable. Further, the antiozonant system containing 2 phr of various static protective agents and 8 phr of Irganox (samples 6-8 (c)) resulted in a lower resistance to ozone.

Surprisingly, the use of Vulkazon AFS/Irganox 1520 mixtures in the absence of static protective agents, made it possible to obtain antiozonant systems with an increasing protective action, proportional to the increase in the amount of Irganox 1520 used, until attainment of the optimal performances obtained using 8 phr of Irganox 1520 alone (sample 11(i)).

Even though the results obtained with the samples 1-8 (c) would have discouraged further experimentation, the Applicant decided to continue, arriving at the optimal and unexpected result in terms of resistance to atmospheric ozone and colour alteration, obtained with the use of 8 phr of Irganox 1520 alone (sample 11(i)).

The invention claimed is:

1. A tyre for vehicle wheels comprising:
   at least one external structural element comprising a crosslinked elastomeric material, wherein the crosslinked elastomeric material comprises, before vulcanization, a crosslinkable elastomeric composition and the crosslinkable elastomeric composition comprises:
   at least one diene elastomeric polymer,
   a system for protection against ozone substantially free of polymeric static protective agents, wherein the system consists essentially of at least one phenolic antioxidant and the at least one phenolic antioxidant is present in an amount equal to or higher than 3 phr and lower than 15 phr; and
   wherein the system further consists essentially of at least one cyclic-acetal or enol-ether antioxidant, and the at least one cyclic-acetal or enol-ether antioxidant is present in an equal amount to or higher than 1 phr and lower than 10 phr.

2. The tyre according to claim 1, further comprising:
   at least one carcass structure with opposite side edges associated with respective annular reinforcing structures,
   a tread band in a radially out position to the carcass structure, and
   a pair of sidewalls laterally on opposite sides with respect to the carcass structure.

3. The tyre according to claim 1, wherein the at least one external structural element is chosen from a sidewall and a pair of sidewalls.

4. The tyre according to claim 3, further comprising one or more decorative elements on an external surface of the sidewall or the pair of sidewalls.

5. The tyre according to claim 1, wherein the system is substantially free from antiozonants and/or antioxidants different from the phenolic, cyclic-acetal or enol-ether antioxidant.

6. The tyre according to claim 1, wherein the at least one phenolic antioxidant is present in an amount lower than 12 phr.

7. The tyre according to claim 1, wherein the at least one cyclic-acetal or enol-ether antioxidant is present in an amount lower than 8 phr.

8. The tyre according to claim 1, wherein the at least one phenolic antioxidant is chosen from:
   pentaerythritol tetrakis [3-(3,5-di-t-butyl-4-hydroxyphenyl) propionate];
   2,2-thio-diethylene bis-[(3-(3,5-di-t-butyl-4-hydroxyphenyl) propionate)];
   octadecyl-3-(3,5-di-t-butyl-4-hydroxyphenyl) propionate;
   isoocyl-3-(3,5-di-t-butyl-4-hydroxyphenyl) propionate;
   1,3,5-trimethyl-2,4,6-tris(3,5-di-t-butyl-4-hydroxybenzyl) benzene;
   4,6-bis (dodecylthiomethyl)-o-cresol;
   4,6-bis (octylthiomethyl)-o-cresol;
   triethylene glycol-bis[(3-(3-t-butyl-5-methyl-4-hydroxyphenyl) propionate)];
   1,6-hexanediol-bis[3,5-di-t-butyl-4-hydroxyphenyl) propionate]; and
   4{[4,6-bis(octylsulphanyl)-1,3,5-triazin-2-yl]amino}2,6-di-t-butylphenol.

9. The tyre according to claim 1, wherein the at least one phenolic antioxidant is chosen from 4,6-bis(octylthiomethyl)-o-cresol and 4{[4,6-bis(octylsulphanyl)-1,3,5-triazin-2-yl]amino}2,6-di-t-butylphenol.

10. The tyre for vehicle wheels according to claim 1, wherein the at least one cyclic-acetal or enol-ether antioxidant is chosen from 3,9-di-3-cyclohexen-1-yl-2,4,6,10-tetraoxaspiro-[5.5]undecane and cyclohexen-3-ylidenemethyl-benzyl ether.

* * * * *